United States Patent
Kawashita et al.

[11] Patent Number: 6,102,642
[45] Date of Patent: Aug. 15, 2000

[54] SCREW HEAD

[75] Inventors: Kenji Kawashita; Junta Okamura; Takayuki Sato; Hisayoshi Yamamoto, all of Kawachinagano, Japan

[73] Assignee: Yamahiro Co., Ltd., Osaka, Japan

[21] Appl. No.: 09/118,058

[22] Filed: Jul. 17, 1998

[51] Int. Cl.[7] .............................. F16B 23/00; F16B 35/06
[52] U.S. Cl. ..................... 411/401; 411/402; 411/387.3; 411/919
[58] Field of Search .................................... 411/401, 402, 411/403, 404, 405, 410, 419, 919, 3, 5, 910, 386, 387.3

[56] References Cited

U.S. PATENT DOCUMENTS

| | | | |
|---|---|---|---|
| 662,134 | 11/1900 | Rodd | 411/405 |
| 2,451,747 | 10/1948 | Kindt | 411/405 |
| 3,236,141 | 2/1966 | Smith | 411/404 X |
| 4,085,650 | 4/1978 | Flynn | 411/910 X |
| 5,433,569 | 7/1995 | Fall et al. | 411/387.3 |
| 5,716,112 | 2/1998 | Staszak | 411/5 |

FOREIGN PATENT DOCUMENTS

| 170244 | 10/1921 | United Kingdom | 411/386 |
|---|---|---|---|

*Primary Examiner*—Neill Wilson

[57] ABSTRACT

A drilling tapping screw includes a head engageable with rotary fastening tool, and a shank extending downward from the head and having a lower end having with a drilling tip, including a tapping and fastening thread defined from the end face thereof to the head. The head includes a pointed projection, an engaging portion engageable with the rotary fastening tool, and a collar. The pointed projection consists of a first tapered portion with a conical top end, a shaft with a fixed outer diameter, and a second tapered portion formed in the wake of the latter. Frame members made of steel are first firmly fastened by the screw, and joined to a wallboard, so that all the head portions except the collar stab the wallboard by striking with a hammer the site where the head is positioned. This temporarily locks the wallboard and prevent any warping of the site where the head is positioned in the wallboard.

24 Claims, 16 Drawing Sheets

FIG. 5
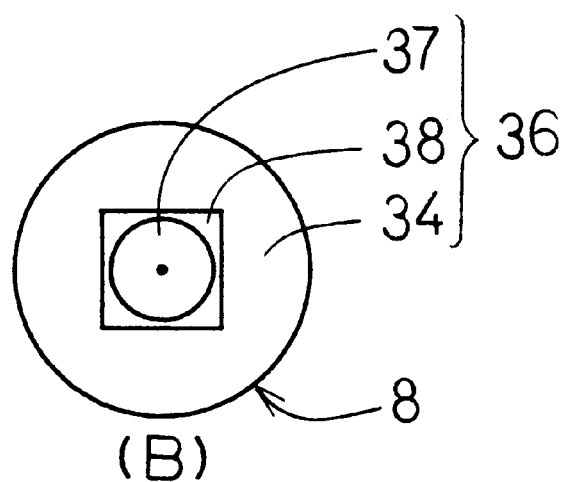
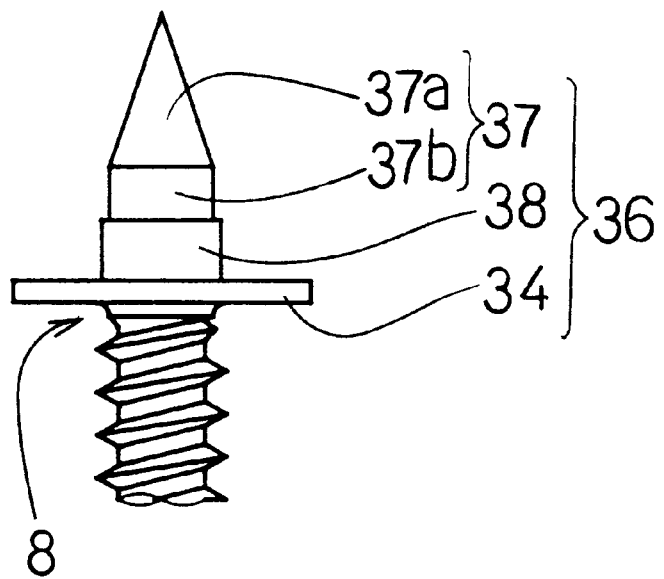

FIG. 8
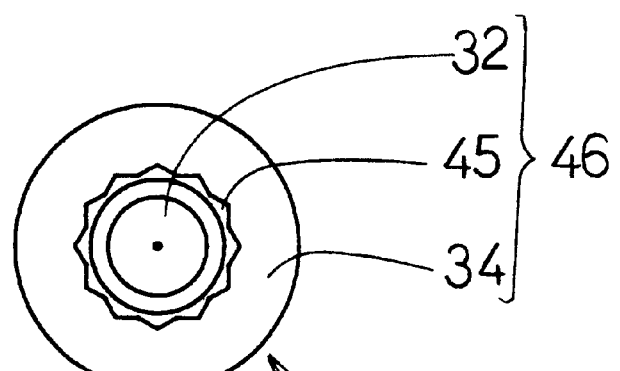
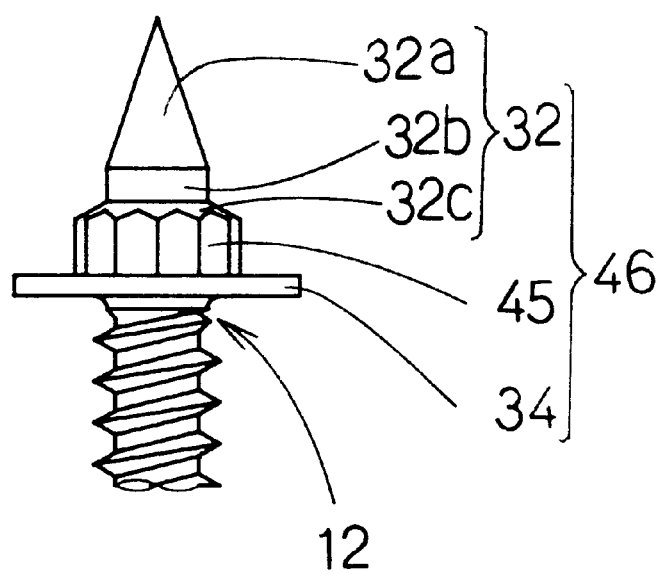

FIG. 13
(A)
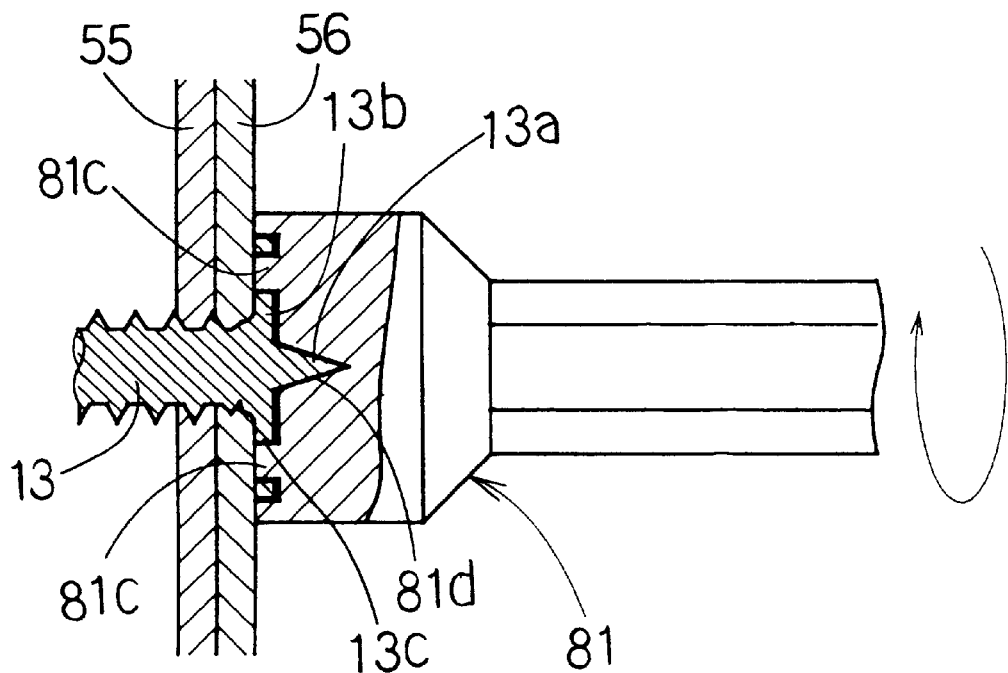
(B)
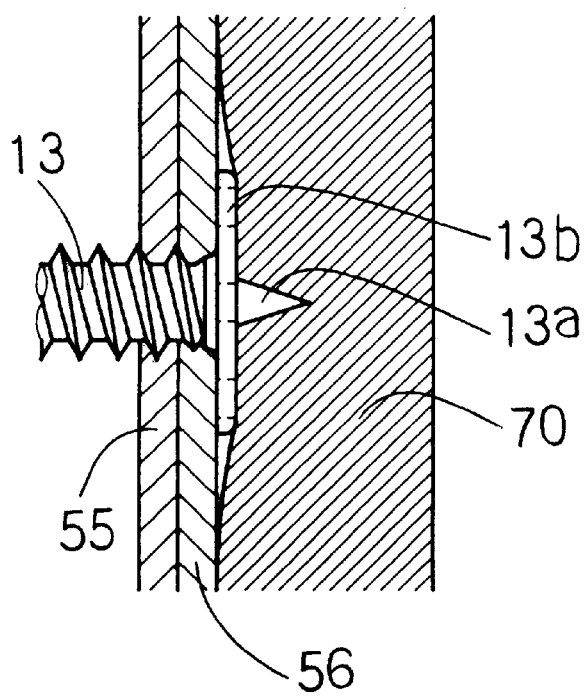

FIG. 14
PRIOR ART
(A)
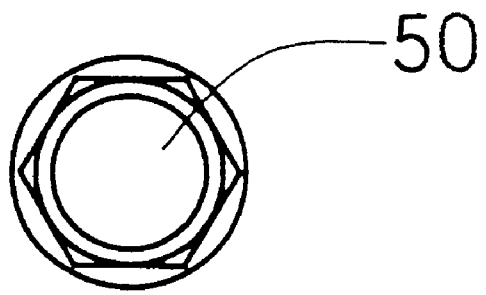
(B)
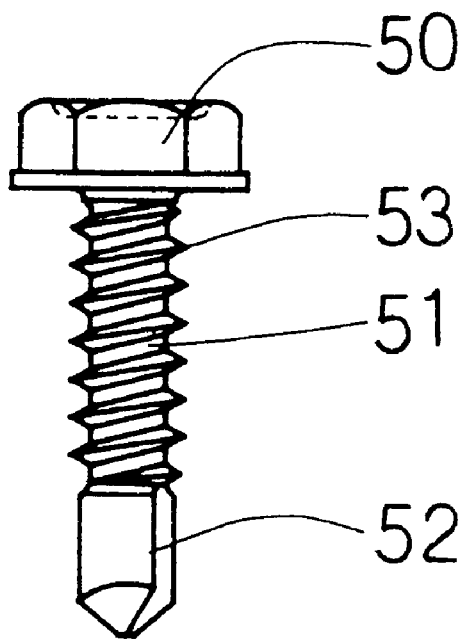

SCREW HEAD

BACKGROUND OF THE INVENTION

The present invention relates to an improvement of the head of a drilling tapping screw for use in fastening steel plates together so that it may drill a starting hole to execute tapping and fastening operation. This specific improvement may be applied to other every kind of screw heads.

Fig.14 shows a conventional drilling tapping screw with a hexagonal head, (A) being a plan view and (B) a front view.

Said conventional drilling tapping screw comprises a hexagonal head 50, and a shank 51 extending downward from the head 50 and having a drilling portion 52 on its lower end. A tapping and fastening thread 53 is formed on shank 51 so as to extend from the basal part of said drilling portion 52 toward the head 50. This particular drilling tapping screw is used in securely fastening metallic plates such as steel plates together, or fastening others object to such a metallic plate, so that said drilling portion 52 may drill a starting hole in the metallic plate through the other object, while its thread 53 chases a female screw thread in the starting hole as it fastens the object to the plate at the same time.

The head 50 of said drilling tapping screw may be of pan, oval, or hexagonal shape, and, in general, has a slotted or cross-recessed groove thereon.

A rotary fastening tool may be engaged with this head 50 to provide a driving force to the head 50, thereby driving the screw into the metallic plate.

As mentioned above, this drilling tapping screw is widely used to firmly fasten metallic plates to each other, or to fasten a metallic plate to an object made from another material. For example, the screw may be utilized in the construction of steel houses which are now opening a market in the housing industry. The steel house is built by means of a framing method using galvanized steel members with a thickness of around 1mm. The framework is, of course, constituted by steel products. To firmly fasten together such steel products to constitute a framework, drilling tapping screws are used.

FIG. 15 illustrates fastened frame members for a steel house. As shown in FIG. 15(A), stud members 56 used as stanchions are vertically spaced on a track member 55, with the stud members 56 and track members 55 being securely joined by drilling tapping screws 60. The upper portions of the stud members 56 are not shown for simplicity.

FIG. 15(B) is an enlarged view showing the track member 55 and the stud member 56 securely fastened together from opposite sides thereof, with the head of the drilling tapping screw 60 sticking out of the track member 55.

A wallboard 70 such as plasterboard is, for example, joined to this framework, and then, securely fixed to the frame by a drilling tapping screw 61.

FIG. 15(C) is a plan view illustrating the wallboard 70 fastened to the framework for a steel house.

After fastening the stud member 56 to the track member 55 with the drilling tapping screws 60, the wallboard 70 may inevitably rise and get wavy at a site where the head of the drilling tapping screw 60 is positioned, depending on the size or thickness of the head, as illustrated.

FIG. 16 is an enlarged view illustrating a wallboard 70 fastened to a framework. This shows the result of a process comprising firmly fastening a track member 55 to a stud member 56 by means of a drilling tapping screw 60, then joining the wallboard 70 to this frame using another drilling tapping screw 61. As apparent from this figure, the wallboard 70 rises at a site where the head 50 of the drilling tapping screw 60 is placed.

It appears that in order to avoid such a rising or waving in the wallboard, decreasing the thickness of head 50 can solve the above problem, but a thinner head requires formation of a cross-shaped groove thereon so that the head may receive a driver bit defining a tip engaging portion of rotary fastening tool. Also, the formation of cross-shaped groove decreases the screw head strength, so that the screw head may torn off when the drilling tapping screw is driven by the rotary fastening tool.

Therefore, the present invention has a primary task of totally eliminating any waving or rising phenomenon of the wall-board which may inevitably occur in fastening the wallboard etc. to the steel framework by the use of the above-described conventional drilling tapping screws.

Thus, an object of the present invention is to totally prevent different plates joined to the surface of a frame from rising or getting wavy because of the head of the drilling tapping screw which may stick out from said frame after fixing together the metallic frame members with the drilling tapping screw.

On the other hand, it is a further object of the present invention to provide a drilling tapping screw having a high-strength head regardless of its shape thereof during the fastening operation.

It is also another objective of the present invention to enable temporary locking of a wallboard on a frame in advance of fixing the wallboard to the frame in the construction of steel house.

That is, if the screw head is arranged in a shape so that it may stab through the wallboard, the head of a drilling tapping screw intended for fixing the framework can also temporarily lock the wallboard in advance with a site thereof to ensure that the subsequent fixing operation for the wallboard will be easily carried out by a drilling tapping screw.

Thus, it is another objective of the present invention to make a screw head in so a specific shape that it may temporarily lock the plate being joined to the screw head. Furthermore, this temporary locking function not only temporarily locks the wallboard on the frame but also result in fixing the wallboard at both its front and back sides, which increases the fixing strength as well as resistance to quakes in prefabricated buildings such as said steel houses.

The present invention has been made to improve the head of the drilling tapping screw in the above-mentioned manner, and can be adapted to all types of screw heads.

BRIEF SUMMARY OF THE INVENTION

To address the foregoing objectives, a first aspect of the present invention is a screw comprising a head engageable with rotary fastening tool and a shank extending downward from the head and having at least a fastening thread thereabout. The head has such a shape that it may stab or bury itself in a plate such as a plasterboard mounted thereover.

A second aspect of the present invention is a screw comprising a head engageable with rotary fastening tool, and a shank extending downward from the head and having at least a locking thread thereabout. The outer periphery of the shank has on at least a part thereof a substantially conical or pyramidal tapered portion constituting all or part of the tip outer periphery.

The substantially conical or pyramidal tapered portion, as indicated above, defines all or a part of an outer periphery of a pointed end, for example, including the shape of the end of screwdriver for linear slot head screw. Also, it may have a plurality of raised ribs or recessed grooves vertically positioned in parallel on the periphery.

The pyramidal shape includes a triangular pyramid and other polygonal pyramids, except for a square pyramid.

A third aspect of the present invention is that the tapered portion in the second aspect of the invention is constituted by an incline in the shape of a straight line or curved line close to straight line viewed from the side.

This incline of the tapered portion need not always be an exactly straight line viewed from the side, but may be a slightly rising or recessed curve.

A fourth aspect of the present invention is a screw head according to the second or third aspect discussed above, and having a collar under the base of screw head opposite to the shank, the collar acting as an engaging portion engageable with rotary fastening tool.

Since the collar can function as the engaging portion engageable with a fastening tool, the shape of the head which may stab wallboard and the like may be designed more freely. Consequently, the head can be designed with a shape such that all portions of the head except for the collar may more effectively stab or bury itself in the wallboard.

A fifth aspect of the present invention is a screw comprising a head engageable with rotary fastening tool, and a shank extending downward from the head and having at least a fastening thread formed thereon. At least one part of the head has a substantially columnar or prismatic intruding portion which is relatively larger than its outer diameter in height.

The substantially columnar shape is meant to include one having an oval bottom, while the substantially prismatic shape includes square, rectangular, triangular, or other polygonal-shaped bottoms. In the present invention, the tapered portion in accordance with the previous aspect of the invention is, in a sense, not inclined but formed in a vertical plane.

According to a sixth aspect of the present invention, the outer periphery of the intruding portion in the fifth aspect of the invention has a periphery in the shape of a straight line, or a curved line close to a straight line viewed from the side.

Consequently, the periphery of the substantially columnar or prismatic intruding portion does not necessarily need to be formed by a vertically straight line but a somewhat rising or recessed curved line viewed from the side.

A seventh aspect of the present invention is the screw head in the fifth or sixth aspect of the invention, where a collar is formed under the base of the screw head opposite to the shank, the collar serving as an engaging portion engageable with a rotary fastening tool.

This aspect of the invention provides the same action as the fourth aspect, wherein the collar provided on the screw head can function as an engaging portion engageable with a rotary fastening tool.

With such a featured drilling tapping screw in accordance with the present invention, for example, frame members made of steel etc., may be fastened together and locked. The screw head may then be stuck into a plate such as plasterboard being mounted on to the frame to such an extent that the screw head is buried in the plate. Therefore, the plate may be flatly joined to the framework without sites corresponding to the screw heads rising or getting wavy.

When plates such as wallboards are joined to the frame members already securely fastened by said screws, the screw heads can stab into the plate because of its specific configuration, so that the plate may be temporarily locked at the site of the screw head, thereby avoiding the trouble of holding the plate. This ensures that the subsequent fixing operation for the plate is made much easier.

Such a temporary locking operation results in fastening the plates at the front and back sides thereof for a further increase of the fixing strength, and the resistance to quake can be greatly improved in the assembly of steel houses.

BRIEF DESCRIPTION OF THE DRAWINGS

FIG. 5 shows a eighth embodiment of the present invention, (A) being a plan view, and (B) a front view of same;

FIG. 8 shows a twelfth embodiment of the present invention, (A) being a plan view, and (B) a front view of same;

FIG. 13 illustrates the use of the drilling tapping screw in accordance with the thirteenth embodiment of the present invention, (A) illustrating driving the screw of the thirteenth embodiment with the rotary fastening tool into a frame member, and (B) illustrating a temporary locked state of the wallboard using the same screw;

FIG. 14 shows a conventional drilling tapping screw, (A) being a plan view, and (B) a front view of same;

DETAILED DESCRIPTION OF THE PREFERRED EMBODIMENTS

The embodiments of the present invention will be described with reference to the accompanying drawings. FIGS. 1 to 13 illustrate the different embodiments of the present invention.

Figure 1:
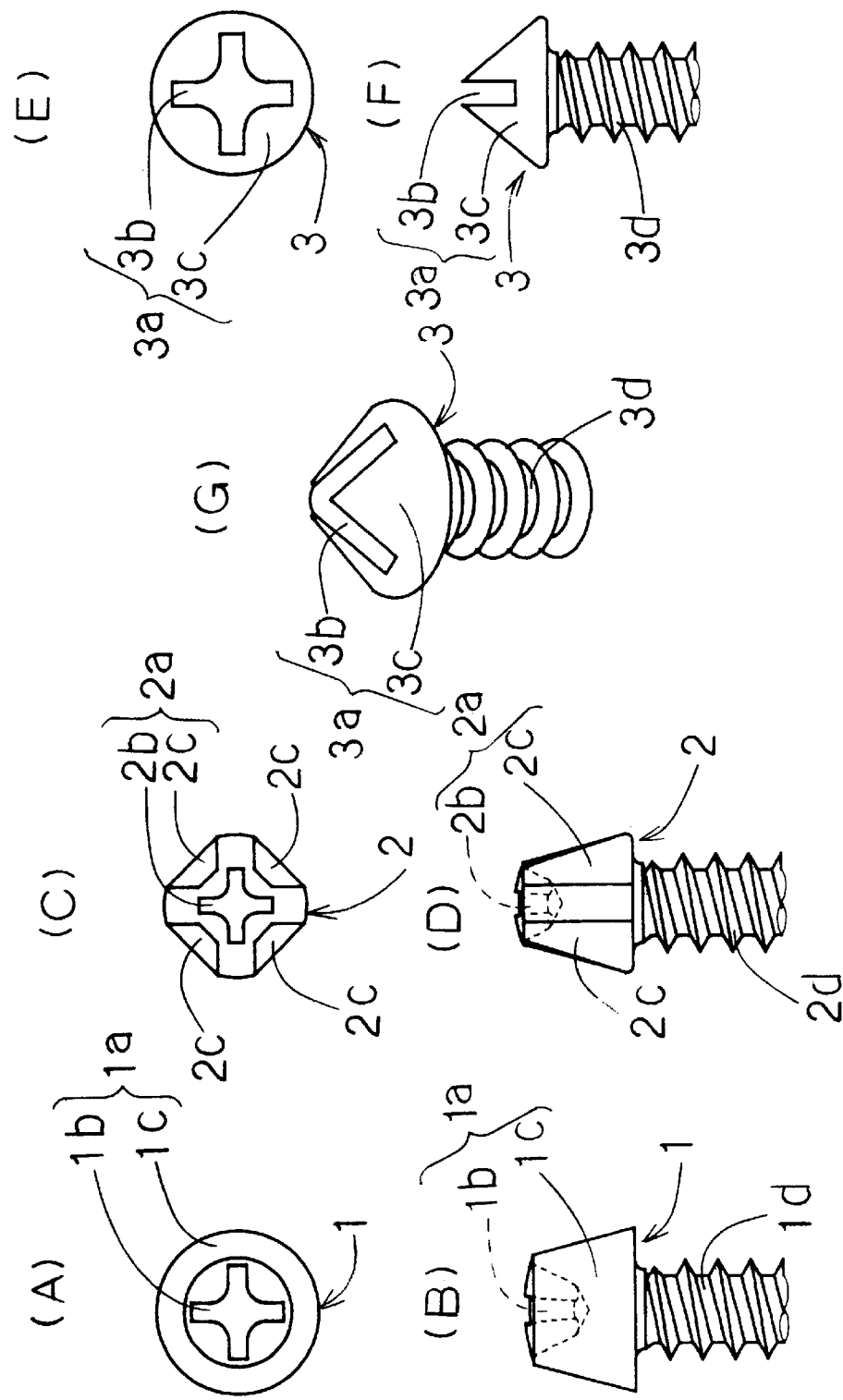
FIG. 1 shows different embodiments of the present invention, (A) being a plan view of a first embodiment, (B) a front view of same, (C) a plan view of a second embodiment, (D) a front view of same, (E) a plan view of a third embodiment, (F) a front view of same, and (G) a perspective view of same.

FIG. 1 shows different kinds of embodiments in accordance with the present invention, (A) being a plan view of the first embodiment, (B) a front view of same, (C) a plan view of the second embodiment, (D) a front view of same, (E) a plan view of the third embodiment, (F) a front view of same, and (G) a perspective view of same.

First, referring to the drilling tapping screw in accordance with the first embodiment as shown in FIGS. 1(A) and (B), a head $1a$ is substantially in the shape of a truncated cone, having a cross-shaped groove $1b$ formed thereon so as to engage with the distal engaging portion of a rotary fastening tool or a driver bit (not shown).

Said head $1a$ has a tapered side peripheral portion $1c$, with the portion above the base of head $1a$ opposite to the upper end tapering off. The tapered portion $1c$ as shown is linearly tapered, viewed from the side. Namely, the tapered portion $1c$ is substantially the same in shape as the base of a cone.

Although said tapered portion $1c$ has an incline in the shape of a slanted straight line, it does not matter, of course, if the incline is not in the shape of an exactly straight line but a curved line close to a slightly rising or recessed straight line. This may apply to the following embodiments.

A shank $1d$ extending from the head $1a$ downward is the same as the shank of conventional drilling tapping screws in structure. That is, it has a drilling portion (not shown) formed on its tip and a tapping and fastening thread formed about its body. The shank structure is the same as those in the following embodiments.

A groove $1b$ formed on the head $1a$ is the shape of a cross, but it may be of a slot type. As in the embodiments which will be described later, a collar may be formed under the base of the screw head, opposite to the shank, to provide an engaging portion engageable with rotary fastening tool.

This drilling tapping screw 1 is used to securely fasten together frame members of steel etc., and then join the frame members to wallboard such as plasterboard. By striking the wallboard lightly with a hammer at the site of the framework firmly assembled by the drilling tapping screw 1, the head $1a$ of the drilling tapping screw 1 stabs the wallboard and buries itself in the wallboard until the wallboard adjacent to the head $1a$ becomes flat rather than rising, while the head $1a$ performs the temporary locking operation. Thereafter, other conventional drilling tapping screws are used to fix the wallboard to the frame work. This can prevent any rising or waving which may occur at the surface of the frame during the mounting of wallboards on the frame.

Also, when the head $1a$ is stuck and buried in the wallboard, it serves to further fix the wallboard at its back and front sides to ensure that the strength of joining the wallboard to the frame is increased. Therefore, its resistance to quakes is additionally improved in connecting with the construction of buildings.

With a drilling tapping screw 2 in accordance with the second embodiment as shown in FIGS. 1(C) and (D), a head $2a$ has the shape of an oblong and substantially truncated cone, having a cross-shaped groove $2b$ formed centrally on the upper face thereof as in the first embodiment. There are provided chamfer-like tapered portions $2c$ around the cross-shaped groove $2b$ in four sections. Each of the tapered portions $2c$ has an incline formed flat on the surface thereof, and the head $2a$ looks like a substantially pyramidal trapezoid (pyramid base) with a tapered top end. The shank $2d$ extending from the head downward is the same in shape as that of the conventional drilling tapping screw.

In this specific drilling tapping screw 2, the head $2a$ is not the shape of a complete pyramidal trapezoid as seen in the figure, but is substantially pyramid-trapezoidal in its general form though the adjacent tapered portions $2c$ are not in close contact with each other.

In addition, the head $2a$ may be made in other polygonal-trapezoidal shapes than pyramidal trapezoid.

The groove provided on the top of the head for engaging with a rotary fastening tool may have a linear slot-shape rather than a cross shape, and this engaging portion may be formed in the collar provided at the base of the head, opposite to the shank.

These specific shapes of the head $2a$ of the drilling tapping screw 2 allow the head $2a$ to encroach on or sink in the wall-board, so that, as in the first embodiment, when the wallboard is securely joined to the frames, the wallboard may be temporarily locked in place and the fixing strength may be increased, and any eventual rising or waving phenomenon on the wallboard can be avoided.

In a drilling tapping screw 3 in accordance with the third embodiment as shown in FIGS. 1 (E), (F), and (G), head $3a$ is a pointed element with a conical shape.

The head $3a$ is provided with a cross-shaped groove $3b$ on the center of the upper face so that a driver bit serving as an distal engaging portion of a rotary fastening tool may be engaged with this cross-shaped groove $3b$, as in the above-described embodiment. The side periphery of the head $3a$ is a tapered portion $3c$ viewed from the side. The shank $3d$ extending from the head $3a$ downward is the same in shape as that of the conventional ones.

As in the following embodiments, the groove $3b$ formed on the top end of the head may be replaced with a collar which is positioned under the base of the head opposite to the shank, so that part of the collar can be provided with an engaging portion engageable with rotary fastening tool.

Thus, the provision of the triangular head $3a$ with a sharp point viewed from the side may urge the head $3a$ of the drilling tapping screw to encroach on or sink deep in different types of plates being mounted so that the plates may be temporarily locked in place with increased strength. The plates are therefore prevented from rising from inside or warping.

Figure 2:
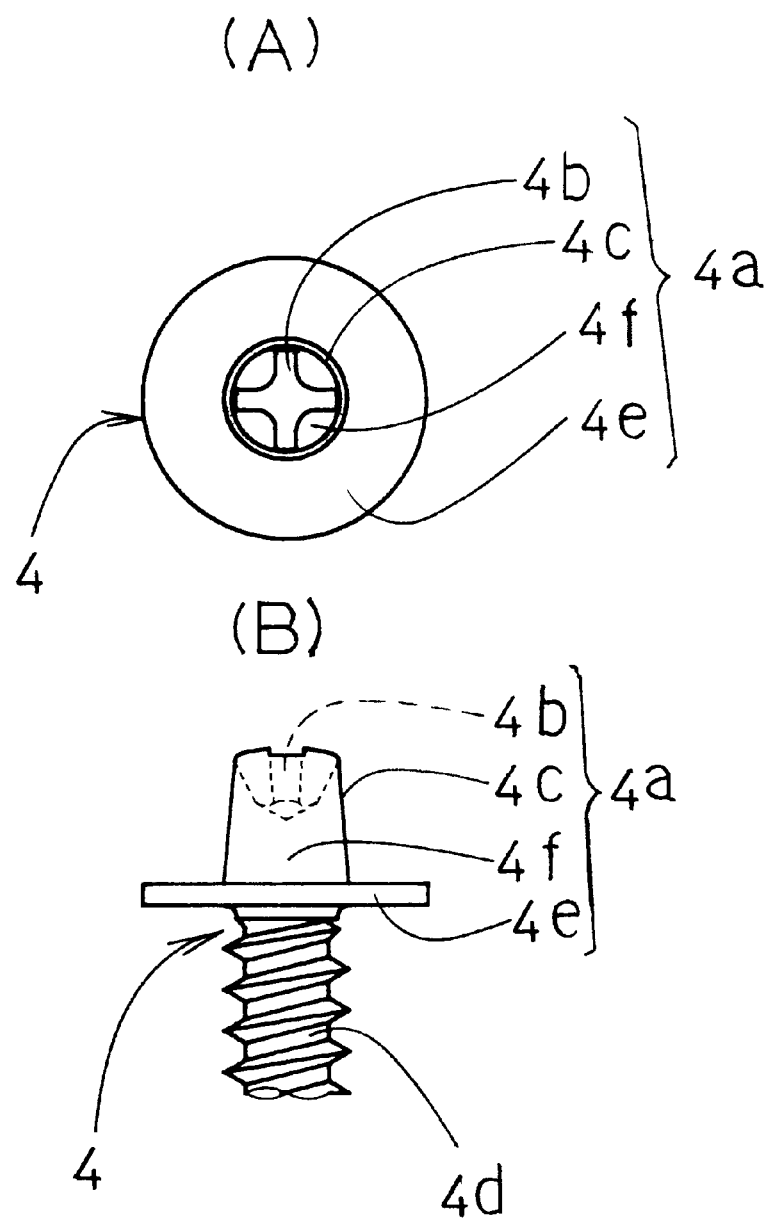
FIG. 2 shows a fourth embodiment of the present invention, (A) being a plan view, and (B) a front view of same.

FIG. 2 illustrates a drilling tapping screw 4 in accordance with the fourth embodiment, FIG. 2(A) being a plan view, and FIG. 2(B) a front view of same.

This embodiment provides a circular collar under the base of the head of the first embodiment opposite to the shank, said head being extended in the vertical direction so as to provide a more steep-sided tapered portion.

With the drilling tapping screw 4, a circular collar 4e is provided under the base of the head 4a. A head body 4f in the shape of a truncated cone is positioned in the center of the upper face of the collar 4e. The outer diameter of the base of the head body 4f is essentially equal to that of a shank 4d, while the outer diameter of the upper end of the head body 4f is slightly smaller than that of said base so that the collar 4e is at close to right angles with the horizontal plane of a tapered portion 4c.

The shank 4d is the same in structure as the counterpart of the previous embodiment.

The head body 4f has a cross-shaped groove 4b engageable with rotary fastening tool and formed on the upper face thereof, as in the above-mentioned embodiment.

The groove may alternatively take the form of a linear slot instead, and as seen in the following embodiment, an engaging portion engageable with rotary fastening tool may be provided in the collar 4e.

Such a specific configuration of the head allows the tapered head body 4f protruding from the head 4a to stab the wallboard to ensure that the wallboard is temporarily locked in place, that the fixing strength is increased, and that the wallboard may be mounted in a flat manner.

Figure 3:
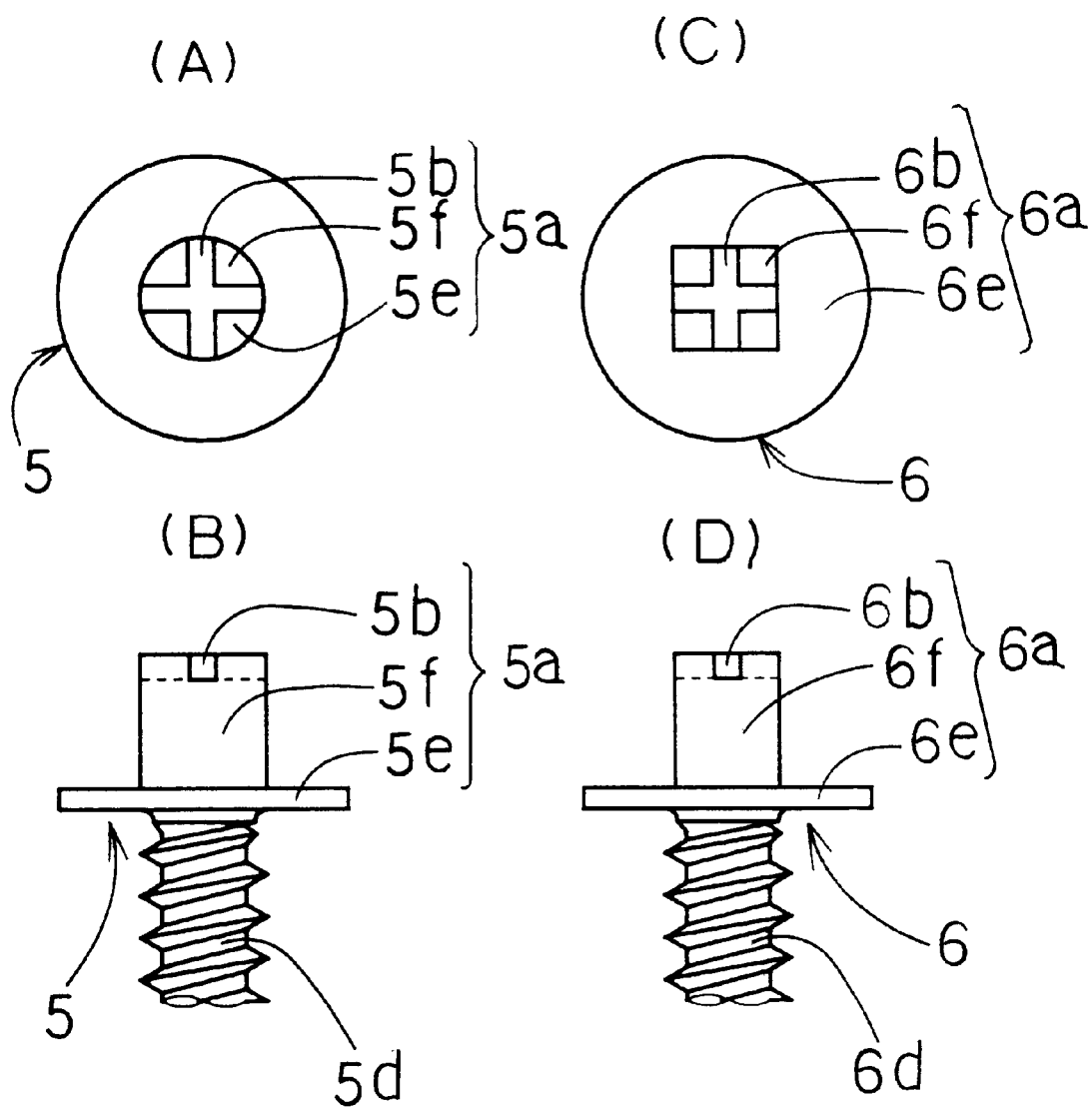
FIG. 3 shows other embodiments of the present invention, (A) being a plan view of a fifth embodiment, (B) a front view of same, (C) a plan view of a sixth embodiment, and (D) a front view of same.

FIG. 3 illustrates drilling tapping screws in accordance with other embodiments; (A) is a plan view of the fifth embodiment, (B) a front view of same, (C) a plan view of the sixth embodiment, and (D) a front view of same.

With these variants, unlike the fourth embodiment, the head body takes the form of a column or prism.

In the fifth embodiment as shown by FIGS. 3(A) and (B), a collar 5e is provided which is circular viewed from above on the lower end of a head 5a, and which has a columnar intruding portion 5f formed in the center thereof. The columnar intruding portion 5f is substantially equal to shank 5d in outer diameter, and the vertical length (or height) of the intruding portion 5f is larger than its outer diameter. Such a configuration allows the intruding portion to stab wallboard and the like effectively. The intruding portion 5f has a cross-shaped groove 5b engageable with a rotary fastening tool formed on the upper face thereof, and the shank 5d is the same in shape as that of the previous embodiment.

The bottom of intruding portion 5f may be substantially oval in shape. The collar 5e is not always essential, because the drilling tapping screw in accordance with the present invention can work normally without it.

Although the outer periphery of the intruding portion 5f is straight viewed from the side, it may alternatively be made somewhat outwardly or inwardly curved.

The sixth embodiment 6 as shown in FIGS. 3(C) and (D) is basically similar to the fifth embodiment, wherein the intruding portion is of the shape of a prism with a square bottom rather than a column.

In the lower end of a head 6a a collar 6e is provided which is circular viewed from above and which has a prism-shaped intruding portion 6f with a square bottom in the center thereof. The vertical length of the prismatic intruding portion 6f is larger than the length of each side of the bottom as well as the length of the diagonal line of the bottom (the maximum outer diameter). Such a configuration allows the intruding portion 6f to stab plates such as plasterboard in an effective manner. The intruding portion 6f has a cross-shaped groove 6b engageable with rotary fastening tool formed on the upper end thereof. A shank 6d is provided with the same in structure as that of the previous embodiment.

This cross-shaped groove 6b may be replaced by a linear slot, and the engaging portion engageable with rotary fastening tool may be provided in the collar 6e.

The bottom of the intruding portion 6f may take an oval, triangular or other polygonal shapes rather than a square shape. The configuration of the collar 6e viewed from above may be square instead of being circular, or may be otherwise freely changed. The collar 6e is not necessarily essential, because the drilling tapping screw in accordance with the present invention can work normally without it.

Even if the intruding portion 6f has a bottom in the shape of a polygon with more than six angles and sides, its height is made larger than its maximum outer diameter so as to provide an oblong element.

Although the intruding portion 6f has an outer periphery which is straight viewed from the side, it may also be made somewhat outwardly or inwardly curved, as in the previous embodiment.

Figure 4:
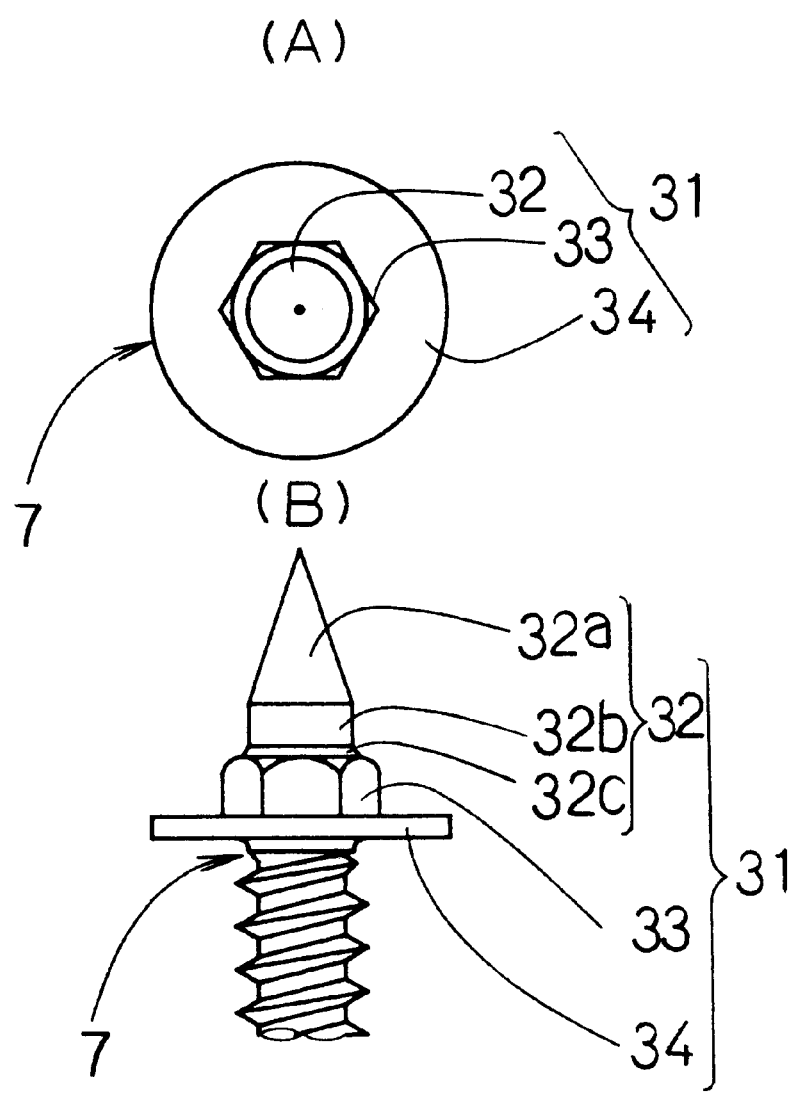
FIG. 4 shows a seventh embodiment of the present invention, (A) being a plan view, and (B) a front view of same.

FIG. 4 illustrates a drilling tapping screw 7 in accordance with the seventh embodiment, (A) being a plan view, and (B) a front view of same.

A head 31 of the drilling tapping screw 7 comprises an acute projection 32, an engaging portion 33 engageable with rotary fastening tool, which is close on the heels of the projection 32 and which is hexagonal viewed from above, and a collar 34 having a circular shape viewed from above and formed under the base of the engaging portion 33.

The projection 32 is a cone-shaped element with a relatively sharp point, the side periphery of which includes a first tapered portion 32a and a shaft 32b with a fixed outer diameter at the lower portion thereof. Under the base of the shaft 32b, there is formed a second tapered portion 32c leading to the periphery of the upper face of an engaging portion 33.

A projection 32 without the shaft 32b and with a fixed outer diameter is also operable as a cone-shaped element which extends continuously from the upper face of the engaging portion 33 upward.

In this embodiment, a different rotary fastening tool than the above-described one is used. The rotary fastening tool in question has, unlike the previously described rotary fastening tool with a driver bit, a hexagonal hole in the leading end thereof so that it may drive hexagonal nuts and bolts.

This specific rotary fastening tool is adapted to communicate rotary driving force and striking force to the drilling tapping screw with its tip engaging portion in meshed relation with the engaging portion 33 of the head 31, so as to fasten together frame members made of steel plates. Thereafter the operations of joining and fixing wallboard to the frames is performed, wherein the projection 32 of the head 31 is thrust into the wallboard up to the engaging portion 33 (i.e., all the parts of the projection 32 except for the collar 34 of the head 31 are buried in the wallboard). The configuration of the shank extending from the base of the head portion 31 downward is the same as that of the previous embodiment.

The engaging portion may be provided in the collar as seen in the subsequent embodiment, but in such a case, said engaging portion 33 is not necessary. Such a variant is similar to the thirteenth (FIG. 11) and fourteenth (FIG. 12) embodiments which will be described later. This applies to the following embodiment.

FIG. 5 shows a drilling tapping screw 8 in accordance with the eighth embodiment of the present invention, the head 36 of said drilling tapping screw being substantially the same as that of the seventh embodiment, except that the engaging portion of the head engageable with rotary fastening tool is different in configuration from that in the previous embodiment.

The head 36 of the drilling tapping screw 8 comprises a projection 37 with a pointed upper end, an engaging portion 38 adjoining the projection 37 and engageable with the rotary fastening tool and having a square shape viewed from above, and a circular collar 34 formed under the base of engaging portion 38.

The projection 37 is a cone-shaped element with a sharp point, including a tapered portion 37a, and a shaft 37b with a fixed outer diameter at the lower part of the tapered portion 37a. In this embodiment, a tapered portion is not formed between the base of the shaft 37b and the engaging portion 38, but such a connection may be provided with a tapered portion anyway. Though the tapered portion 37a is conical in shape, it is natural that this tapered portion may alternatively have the shape of a pyramid. This may apply to said seventh embodiment.

The projection 37 may be provided without the shaft 37b so as to serve a tapered portion starting directly from the upper face of the engaging portion 38, thereby having the shape of cone or pyramid on its own.

Also, in this embodiment, a rotary fastening tool is provided in the leading end thereof with a square hole engageable with the engaging portion 38 of the screw head, instead of the rotary fastening tool equipped with a screwdriver bit.

This rotary fastening tool can act to communicate rotary driving force and striking force to the drilling tapping screw with its tip engaging portion in meshed relation with the engaging portion 38 of the head 36, so as to firmly fasten together frame members made of steel plates. Thereafter, the operation of joining and fixing wallboard to the frames is performed, wherein the projection 37 of the head 36 stab the wallboard, followed by the intrusion of the engaging portion 38 into the wallboard. That is, all the parts of the projection except for the collar 34 of the head 36 can be buried inside the wallboard.

The configuration of the shank extending from the base of the head 36 downward is the same as that of the previous embodiment.

Figure 6:
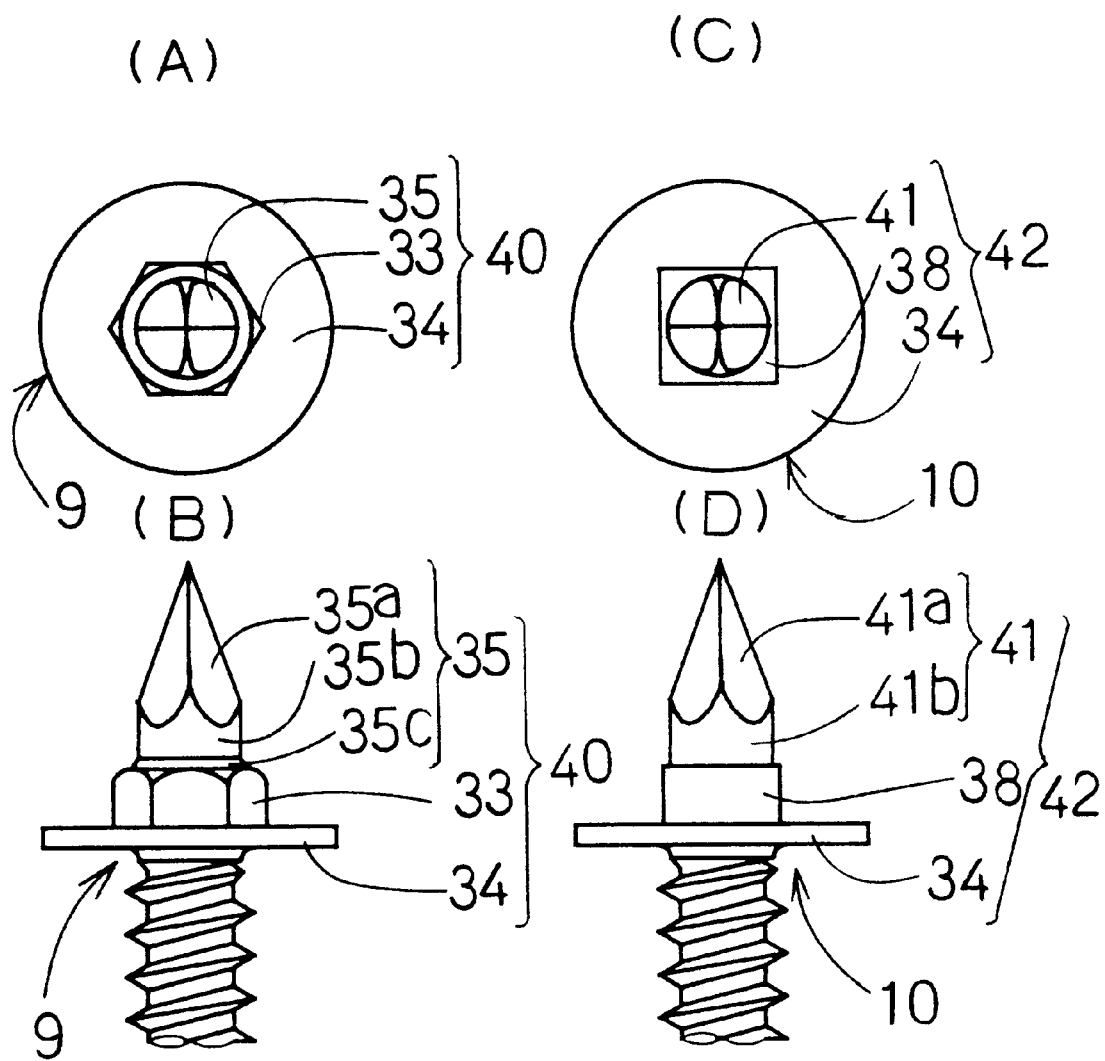
FIG. 6 shows further embodiments, (A) being a plan view of a ninth embodiment, (B) a front view of same, (C) a plan view of a tenth embodiment, and (D) a front view of same.

FIG. 6 illustrates the ninth and tenth embodiments, (A) being a plan view of the ninth embodiment, (B) a front view of same, (C) a plan view of the tenth embodiment, and (D) a front view of same.

In these embodiments, unlike the drilling tapping screws in accordance with the seventh and eighth embodiments, the projections at the head of the drilling tapping screws are not conical but pyramidal in shape, except that the other arrangements are the same as those in the seventh and eighth embodiments.

Head 40 of a drilling tapping screw 9 in accordance with the ninth embodiment as shown by FIGS. 6(A) and (B) comprises a projection 35 with a pointed leading end, a hexagonal engaging portion 33 engageable with the rotary fastening tool and adjoining the projection 35, and a circular collar 34 formed under the base of the engaging portion 33.

The projection 35 is a pyramidal element with a relatively sharp point, including a tapered portion 35a. The lower part of the tapered portion 35a includes a shaft 35b in the shape of a circle having a fixed outer diameter. The base of the shaft 35b leads to a second tapered portion 35c which communicates with the periphery of the upper face of the engaging portion 33.

The configuration of the shank extending from the base of the head 40 is the same as that in the previous embodiment.

The leading end of the projection 35 may take the shape of a triangular pyramid or a polygonal pyramid (except for pentagonal pyramid) rather than a square pyramid.

The projection 35 may be provided without the shaft 35 with a fixed outer diameter so as to serve as a square pyramid-shaped element starting directly from the upper face of the engaging portion 33. Head 42 of a drilling tapping screw 10 in accordance with the tenth embodiment as shown in FIGS. 6(C) and (D) comprises a projection 41 with a pointed leading end, a rotary fastening tool engaging portion 38 adjoining the projection 41 and having a square shape viewed from above, and a circular collar 34 formed under the base of the engaging portion 38.

The projection 41 is a cone-shaped element with a relatively sharp point, comprising a tapered portion 41a, whose lower part defines a shaft 41b having a circular cross section with a fixed outer diameter.

The shank extending from the base of the head 42 is the same in shape as that in the previous embodiment.

In this embodiment, the leading end of the projection 41 may be made in the shape of a triangular pyramid or any polygonal pyramid (with more than six angles and sides) rather than a square pyramid.

The projection 41 may be provided with the shaft 41 with a fixed outer diameter so as to serve as a sequre pyramid starting directly from the upper face of the engaging portion 38.

Also, in these ninth and tenth embodiments, frame members of steel sheets may be firmly fastened together by applying rotational driving force and striking force to the screw heads using a rotary fastening tool with its tip engaging portion fit into the engaging portion of the screw head. Thereafter, the operations of joining and fastening wallboard to the frames are performed, wherein the projections 35, 41 of the heads 40, 42 are thrust into the wallboard, followed by the intrusion of the engaging portions 33, 38 into the wallboards, so that all the parts of the head except for the collar can be buried in the wallboard. This provides temporary locking, improvement of the fixing strength, and avoidance of wallboard warping.

Figure 7:
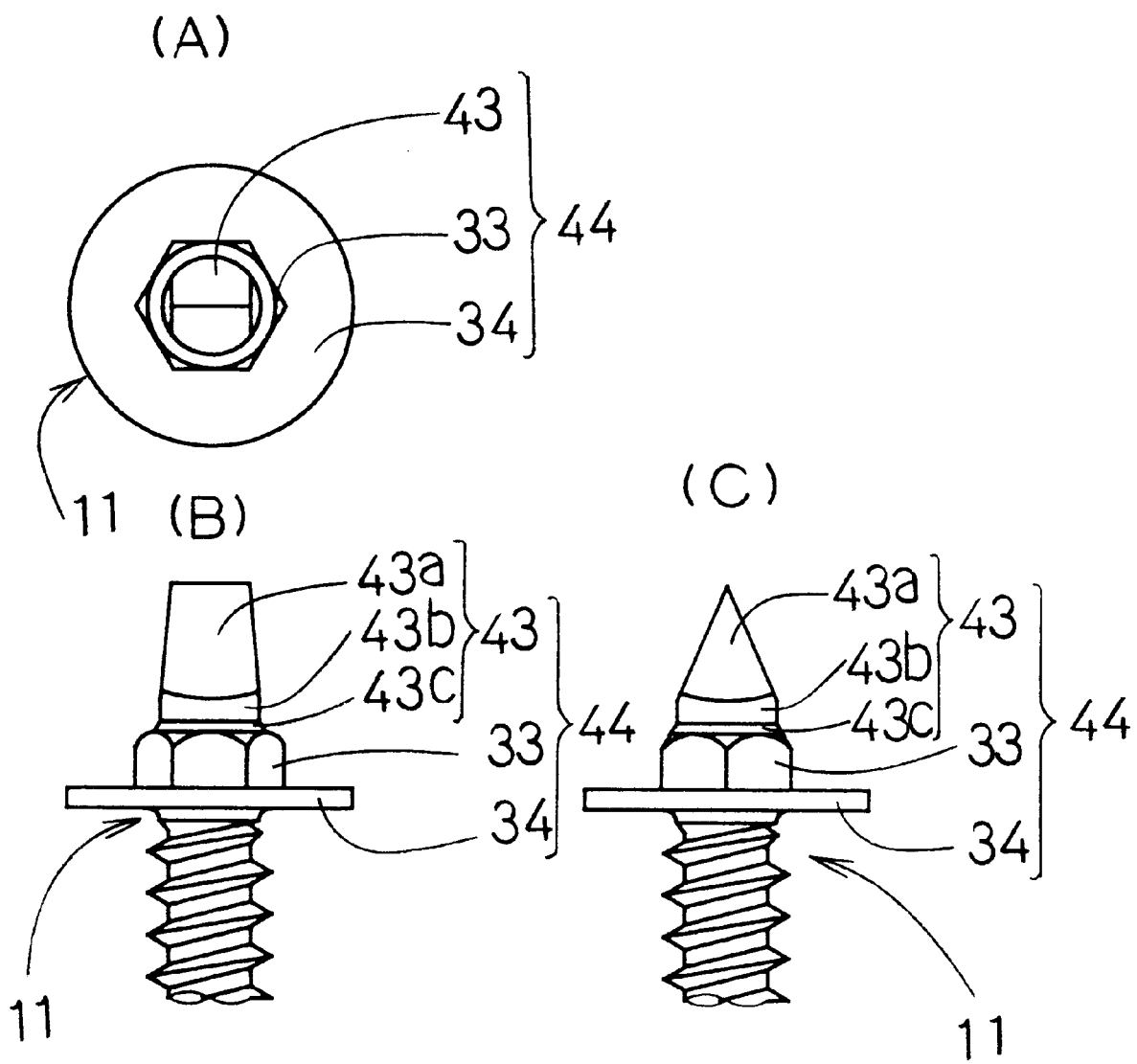
FIG. 7 shows an eleventh embodiment of the present invention, (A) being a plan view, (B) a front view of same, and (C) a side view of same.

In addition, FIG. 7 illustrates the eleventh embodiment, (A) being a plan view, (B) a front view of same, and (C) a side view of same.

This eleventh embodiment is also substantially the same as the seventh embodiment in all respects except the configuration of the pointed projection of the head.

Head 44 comprises a projection 43 having a pointed leading end, a hexagonal engaging portion 33 engageable with the rotary fastening tool adjoining the projection 43, and a circular collar 34 defined under the base of the engaging portion 33.

The leading end of the projection 43 is similar in shape to the leading end of a screwdriver with a linear slot, namely, two opposite inclines meet each other at an upper end to form an isosceles triangle with a vertex angle of around 45° viewed from the side. The inclines define a tapered portion 43a. The lower part of the tapered portion forms a circular shaft 43b with a fixed outer diameter, and the base of the shaft 43b communicates with a second tapered portion 43c leading to the periphery of the upper face of the engaging portion 33. The shaft 43b with a fixed outer diameter may be omitted so as to have a tapered portion 43a starting directly from the upper face of the engaging portion 33.

The configuration of the shank extending from the base of the head 44 downward is the same as that in the previous embodiment.

The drilling tapping screw 11 in accordance with this embodiment may also allow the projection 43 and engaging portion 33 (except for the collar 34) to stab plate materials like wallboard and bury themselves therein.

FIG. 8 shows the twelfth embodiment, (A) being a plan view, and (B) a front view of same. The drilling tapping screw in accordance with this embodiment is similar to the seventh embodiment (FIG. 4) in all respects but the configuration of the engaging portion engageable with a dedicated rotary fastening tool.

The head 46 of drilling tapping screw 12 in accordance with the twelfth embodiment comprises a projection 32 having a pointed upper leading end, an engaging portion 45 engageable with the rotary fastening tool adjoining the projection 32, and a circular collar 34 defined under the base of the engaging portion 45.

The projection 32 is a conical element with a pointed leading end, the side periphery of the leading end defining a first tapered portion 32a, and the lower part of the tapered portion 32a forming a shaft 32b having a fixed outer diameter and being circular in cross section. The second tapered portion 32c leading to the peripheral edge of the upper face of an engaging portion 45 communicates with the base of the shaft 32b.

The engaging portion 45 has a plurality of vertically recessed grooves formed side by side on the circular periphery thereof. A rotary fastening tool for driving this specific screw has in its leading end a hole large enough to accommodate the engaging portion 45 of this screw head 46.

The shaft 32b with a fixed outer diameter may be omitted so as to have a conical tapered portion 32a starting directly from the upper face of the engaging portion 45. Furthermore, the tapered portion 32a may have vertical grooves lined side by side on the surface thereof, as in the engaging portion. This provides an arrangement where the substantially conical tapered portion is seated on the substantially circular part of the engaging portion. In addition, the grooves extending in the vertical direction are continuously ranged in parallel.

The configuration of the shank extending from the base of the head 40 is the same as that in the previous embodiment.

The collar 34 of the head 46 may be omitted so as to allow the projection 32 and engaging portion 45 to stab the plate materials and bury themselves therein.

Figure 9:
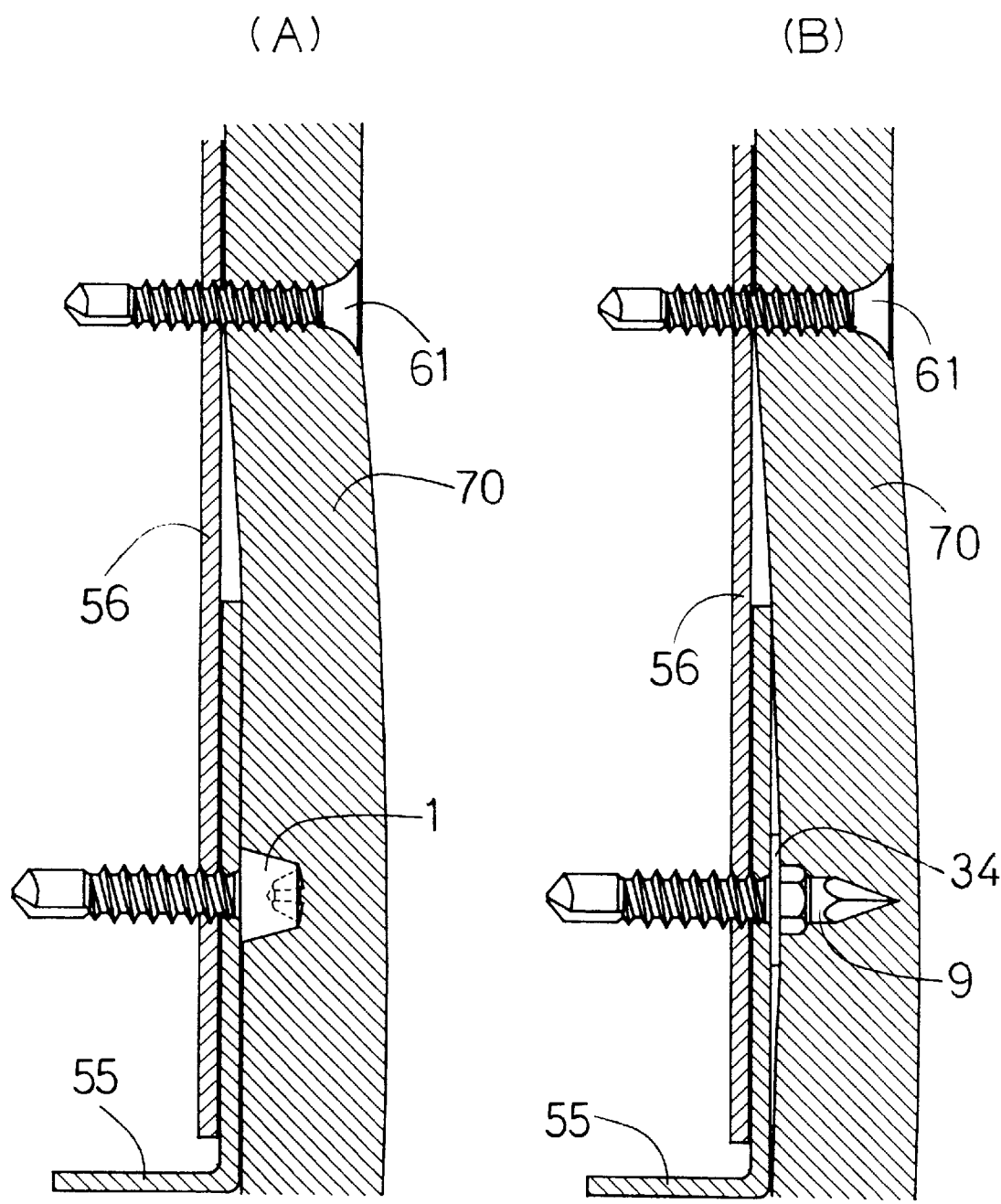
FIG. 9 illustrates the use of drilling tapping screws in accordance with the present invention, (A) being a view illustrating a fixed state of a wallboard by the drilling tapping screw in accordance with the first embodiment, and (B) a view illustrating a fixed state of a wallboard by the drilling tapping screw of the ninth embodiment.

FIG. 9 is a view illustrating wallboard such as plasterboard fixed to frames after frame members 55, 56 have been fastened together using the drilling tapping screws in accordance with the present invention. FIG. 9(A) illustrates the drilling tapping screw 1 in accordance with the first embodiment, and (B) illustrates the drilling tapping screw in accordance with the ninth embodiment.

In either example, drilling tapping screws 1, 9 are used to firmly fasten the frame members 55, 56 together, and then are used to join wallboard 70 to the resultant framework. Then, the sites on the wallboard 70 corresponding to the positions of screws 1, 9 are placed are struck with a hammer or the like, thereby allowing the heads of the screws to stab the wallboard or otherwise bury themselves in the wallboard. This temporarily locks the wallboard 70 to the framework and prevents eventual warping of the sites of the wallboard 70. Such a temporary locking of the wallboard 70 is followed by fixing the wallboard 70 to the framework with a conventional drilling tapping screw 61. It follows from the above fact, therefore, that the fixed wallboard 70 is firmly secured to the framework on its back and front sides, thereby increasing the fixing strength.

With the drilling tapping screw 9 as shown by FIG. 9(B), the wallboard 70 appears to slightly warp because of the thickness of the collar 34. In fact, however, since the interval between the both drilling tapping screws 9 and 61 is quite long, the finished surface of the wallboard 70 will be effectively flat.

Figure 10:
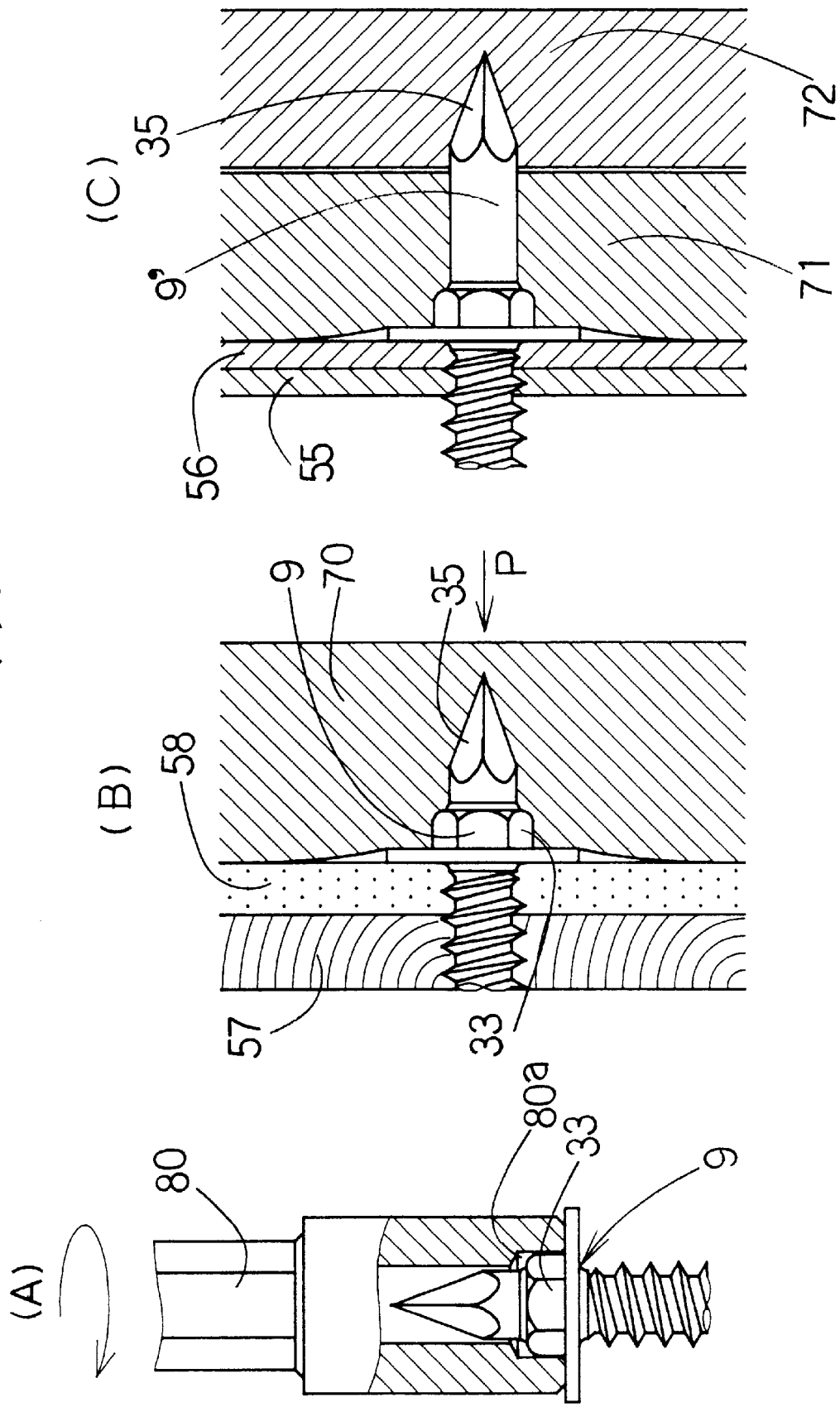
FIG. 10 illustrates a step of driving a drilling tapping screw in accordance with the present invention, and a state of temporary locking, (A) illustrating the screw head of the ninth embodiment engaged with the distal engaging portion of a rotary fastening tool, (B) illustrating temporary locking in accordance with the ninth embodiment, and (C) illustrating temporary locking of two wallboards one on top of the other.

FIG. 10 illustrates other embodiments showing a tightened drilling tapping screw in accordance with the present invention, and the wallboard joined to the frame members, (A)illustrating the tightening of the drilling tapping screw with a rotary fastening tool, and (B) illustrating the frame member and the wallboard temporarily locked together, and (C) two wallboards temporarily locked one on top of the other.

As shown by FIG. 10(A), the rotary fastening tool is provided with an engaging portion 80 having a recess 80a at its leading end, which recess defines a hole which is hexagonal in cross section so that it may closely fit onto the hexagonal engaging portion 33 of the drilling tapping screw 9 for applying a rotary driving force to the drilling tapping screw 9.

FIG. 10(B) illustrates the wallboard 70 temporarily locked to the frame members 57, 58 which are fastened with the drilling tapping screw 9. This temporary locking is followed by a separate joining operation for the frame members 57, 58 and the wallboard 70 (now shown here). By striking the wallboard 70 with a hammer in the direction of arrow P at the site corresponding to the position of the head of the drilling tapping screw 9, the projection 35 and engaging portion 33 of the drilling tapping screw 9 are thrust into the wallboard to the hilt, and buried.

Both the frame members 57, 58 need not be steel sheets; one of them may be wood and the other steel plate.

FIG. 10(C) shows two wallboards temporarily locked one on top of the other to the framework. In such an application, the protruding length of the projection 35 of the drilling tapping screw 9' may be made longer than that of the previous embodiment.

Wallboards 71, 72 as shown in this figure of drawing may not necessarily be made of plaster; for example, plywood may be used. Any material may be used if it can be pierced by the projection 35 of a self-drilling screw.

Figure 11:
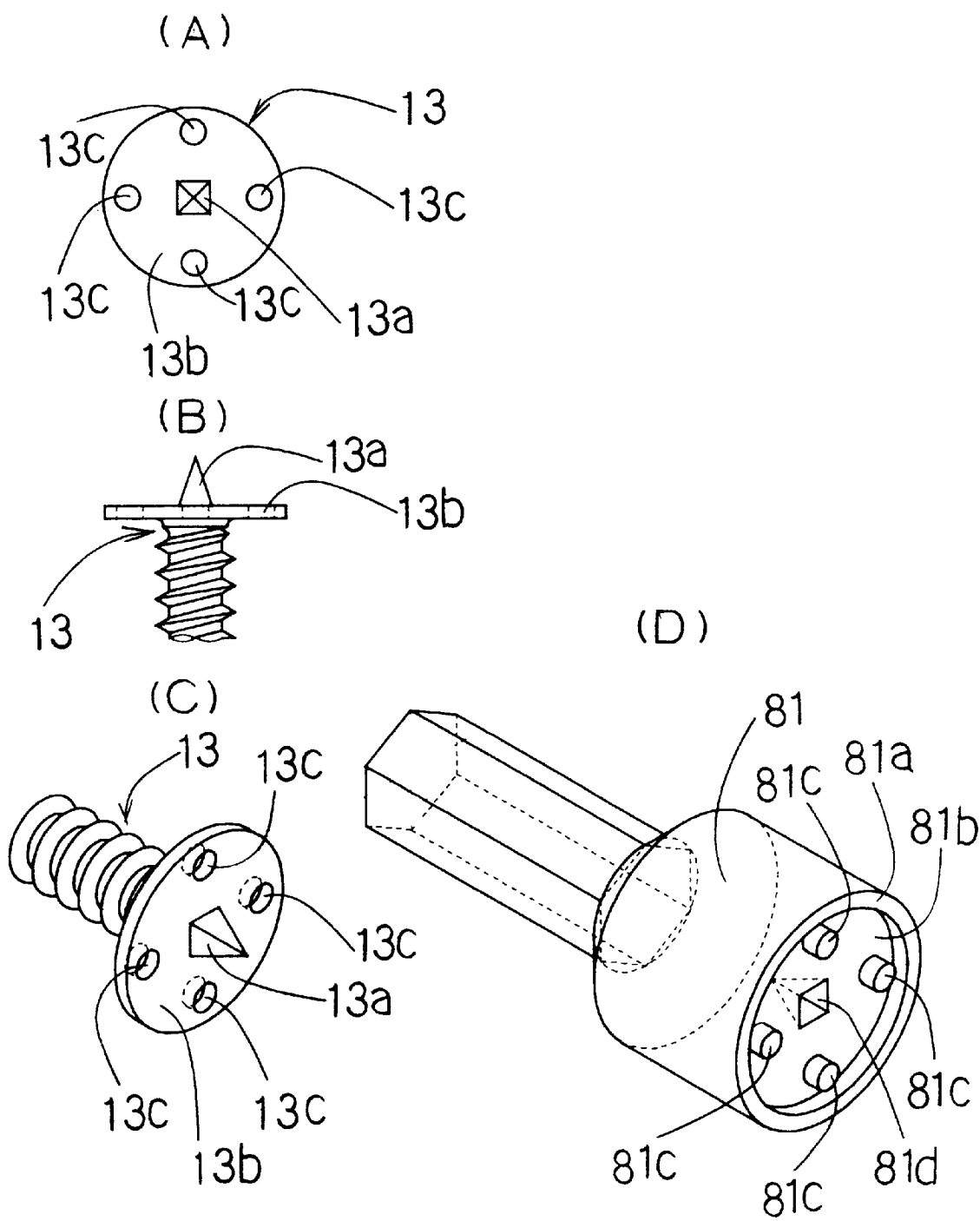
FIG. 11 shows a thirteenth embodiment of the present invention, (A) a plan view, (B) a front view of same, (C) a perspective view of same, and (D) a perspective view of the distal engaging portion of a rotary fastening tool corresponding Thereto.

FIG. 11 illustrates a drilling tapping screw in accordance with the thirteenth embodiment and the distal engaging portion of a rotary fastening tool for applying a driving force to said screw, (A) being a plan view of the drilling tapping screw, (B) a front view of same, (C) a perspective view of same, and (D) a perspective view of the distal engaging portion of the rotary fastening tool.

The illustrated head of the drilling tapping screw comprises a square-pyramidal projection 13a with a pointed leading end, and a circular collar 13b positioned under the base of the projection 13a. The outer periphery of the projection 13a has a tapered portion. Furthermore, there is provided in the collar 13b four engaging holes 13c for engaging with the distal engaging portion of the rotary fastening tool.

The configuration of the shank extending from the collar 13b downward is the same as that in the previous embodiment.

The tip engaging portion 81 of a rotary fastening tool as shown in FIG. 11(D) has on the entire peripheral edge an extension 81a extending in the direction of engagement, and a circular recess 81b is enclosed by the extension 81a so that the circular collar 13b may properly fit into the recess 81b. Four projections 81c defined in the recess 81b are adapted to fit into the corresponding engaging holes 13c formed on the collar 13b. A hole 81d is formed in the center of the recess 81b for receiving the projection 13a of the screw head. In this figure of drawing, the hole 81d takes the shape of a square pyramid, but any shape may be freely selected so long as it constitutes a hole which can receive the projection 13a of the screw head.

Figure 12:
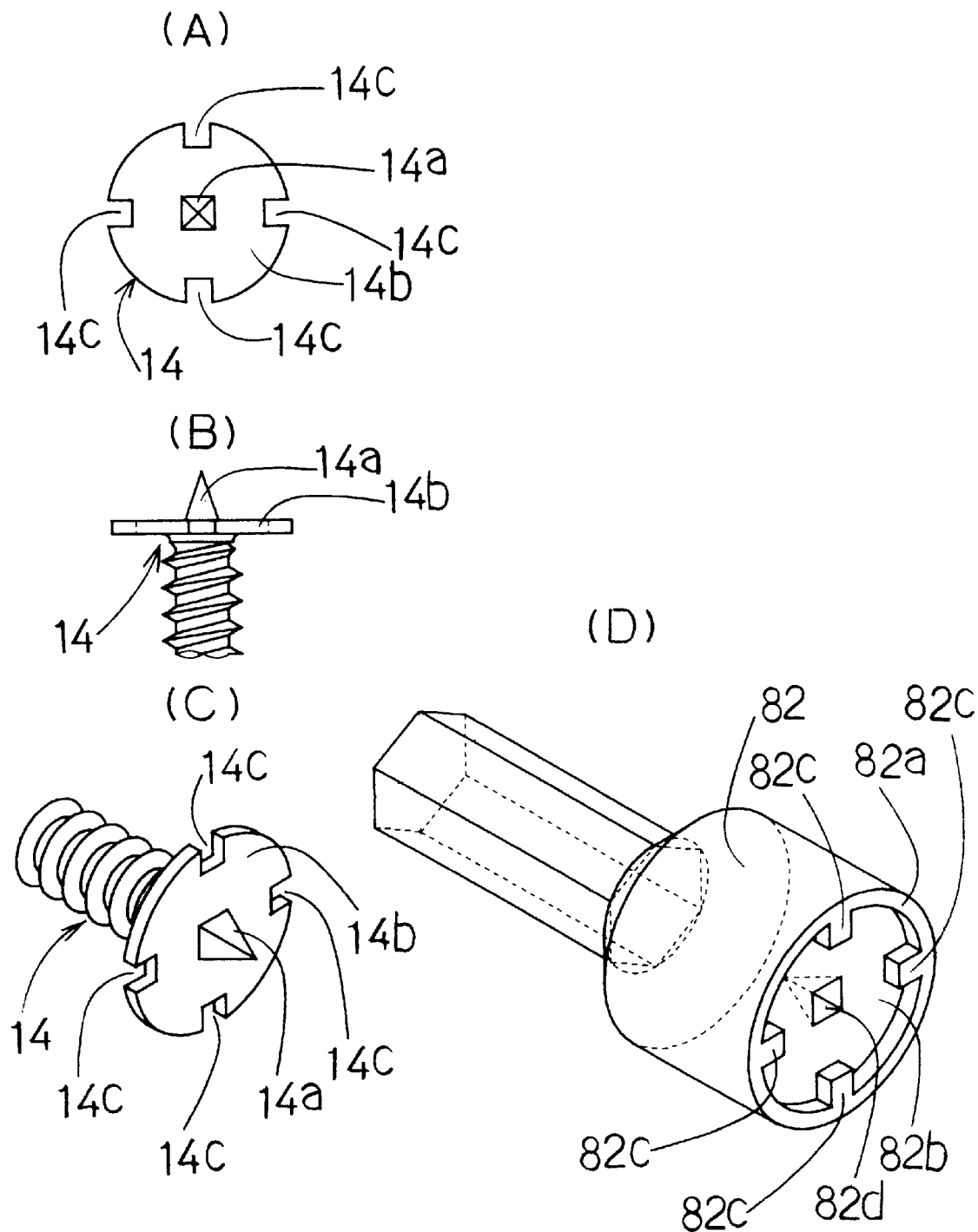
FIG. 12 shows a fourteenth embodiment of the present invention, (A) being a plan view, (B) a front view of same, (C) a perspective view of same, and (D) a perspective view of the distal engaging portion of a rotary fastening tool corresponding thereto.
Figure 15:
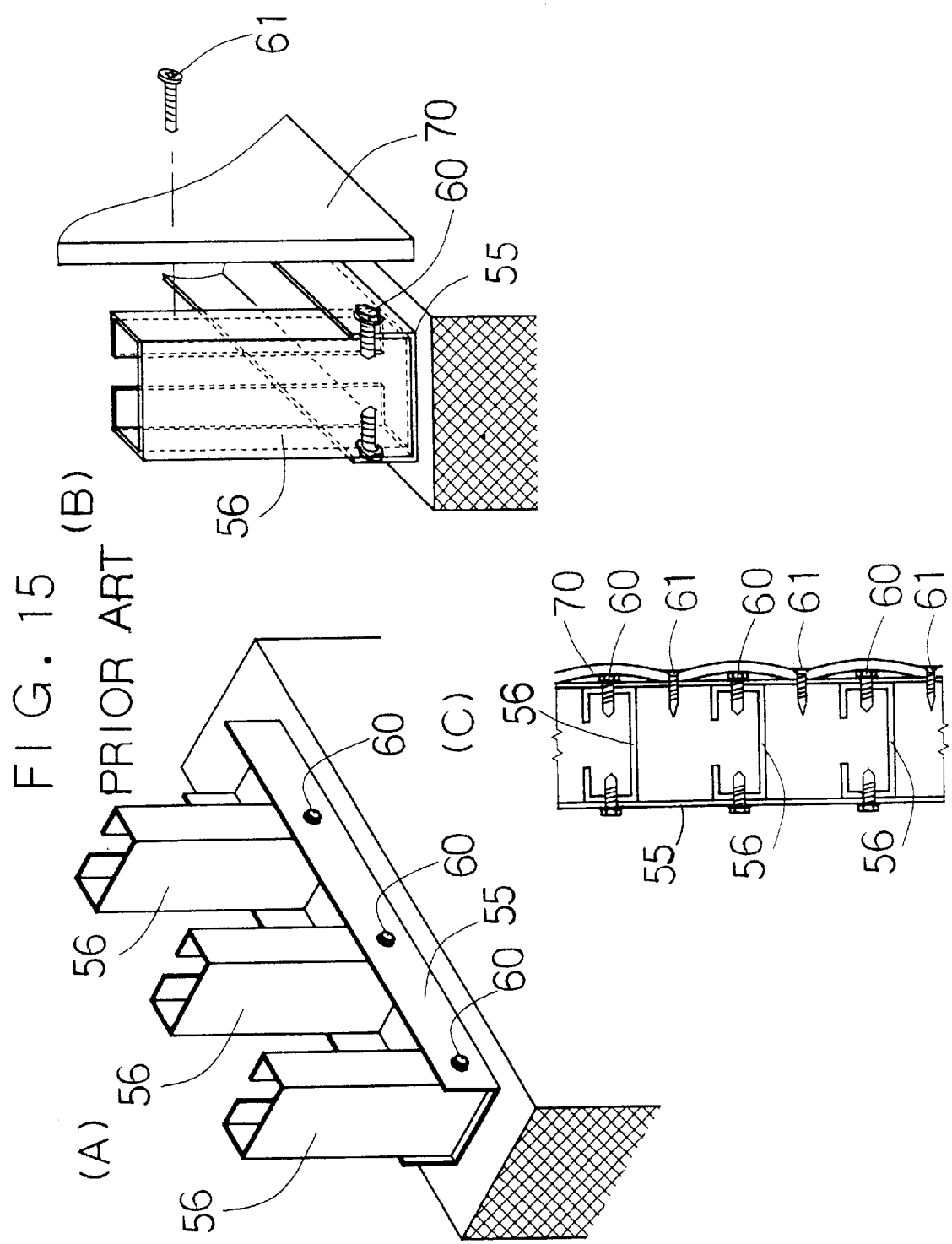
FIG. 15 illustrates an example of the use of the conventional drilling tapping screw, (A) illustrating members fastened together for steel house, (B) being an enlarged view illustrating of the fastened portions, and (C) being a plan view illustrating a wallboard mounted on the frames.
Figure 16:
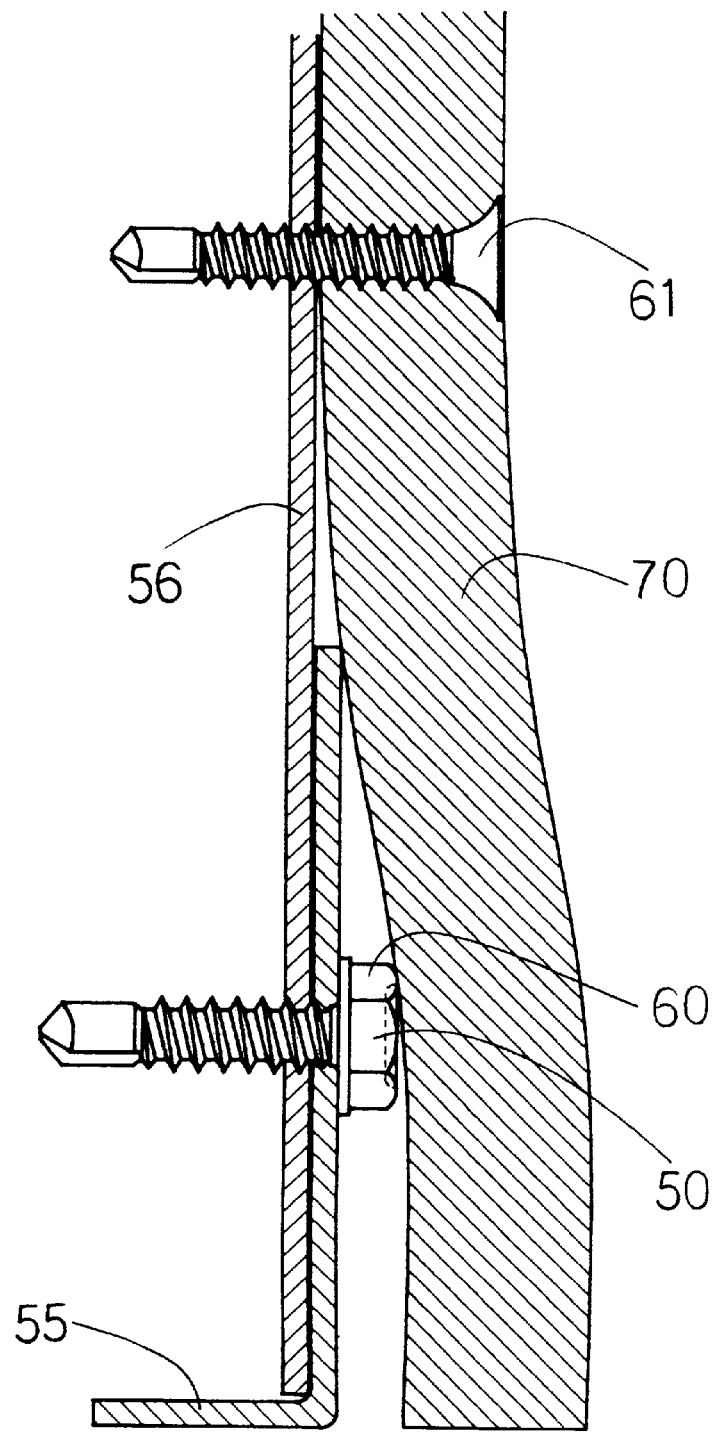
FIG. 16 is a view illustrating a wallboard mounted to frame members with a conventional drilling tapping screw.

FIG. 12 illustrates a drilling tapping screw in accordance with fourteenth embodiment and a tip engaging portion of rotary fastening tool for applying a driving force to the screw, (A) being a plan view, (B) a front view of same, (C) a perspective view of same, and (D) a perspective view of the tip engaging portion of rotary fastening tool.

The illustrated head of drilling tapping screw 14 is basically similar to that of the thirteenth embodiment except that this screw head includes four engaging notches formed on the peripheral edge of the collar instead of the engaging holes provided in the thirteenth embodiment.

This screw head comprises a square-pyramidal projection 14a with a pointed leading end, and a circular collar 14b positioned under the base of the projection 14a.

The outer periphery of the projection 14a has a tapered portion. Furthermore, there is provided four engaging notches 14c on the peripheral edge of the collar 14b for engaging with the distal engaging portion of the rotary fastening tool.

The configuration of the shank extending from the collar 14b downward is the same as that in the previous embodiment.

On the other hand, the distal engaging portion 82 of the rotary fastening tool as shown in FIG. 12(D) has on the entire peripheral edge an extension 82a axially extending in the direction of engagement and defining a circular recess 82b so that the collar 14b of the screw head may properly fit into the recess 32b. Four protrusions 82c are provided extending from four corresponding sites of the extension 82a toward the center so that said protrusions 82c engage the engaging notches formed in the collar 14b of the head of the drilling tapping screw 14.

A hole 82d conforming with the projection 14a of the screw head is disposed in the center. Though this specific hole 82d has the form of a square pyramid, any form may be freely selected as long as it constitutes a hole that can receive the projection 14a of the screw head.

FIG. 13 illustrates a drilling tapping screw in accordance with the thirteenth embodiment, (A) being a partial cross section illustrating the screw is being driven into frame members, and (B) a wallboard temporarily locked to the screwed frame members.

As shown in FIG. 13(A), the drilling tapping screw 13 is driven into the frame members 55, 56 with a rotary fastening tool so as to firmly fasten these frame members together. At this time, a rotational clamping force is transmitted to the screw by the rotary fastening tool because projections 81c defined in the recess of the tip engaging portion 81 are fitted into the engaging holes 13c opened in the collar 13b of the screw head. Since the projection 13a of the screw head is received by the hole 81d provided in the central section of the distal engaging portion of the rotary fastening tool, it does not hinder turning of the screw 13.

After fastening frame members 55, 56, a wallboard such as plasterboard is joined to the resultant framework. As shown by FIG. 13(B), the wallboard 70 may be temporarily locked to the framework by hammering the wallboard 70 at the locations of the projections of the screw heads. Then, the wallboard 70 may be fixed by using a conventional drilling tapping screw (now shown here).

With the drilling tapping screws 13, 14 of the thirteenth and fourteenth embodiments as shown in FIGS. 11 and 12, it is preferable that the head include at least a pointed projection and a collar disposed under the base of the projection so that the collar may engage with the distal engaging portion of the rotary fastening tool.

Projections of various types can be utilized as shown in the foregoing embodiments, which, for example, preferably, are in the shape of a cone, pyramid, tip of a linear slot head screw-driver, or whose bases each are circular or polygonal in cross section, and whose leading end are conical or square-pyramidal; a projection of any shape is available if it has a tip with so sharp a point that it can be thrust into plate material like wallboard.

In addition, the projection may have the form of a truncated cone, pyramidal-truncated cone, column, or prism, as shown in the described embodiments.

In the thirteenth and fourteenth embodiments, the collar of the screw head includes an engaging portion engageable with rotary fastening tool.

In the thirteenth and fourteenth embodiments, in order that the collar can function as an engaging portion for the rotary fastening tool, there are provided four engaging holes 13 and four engaging notches 14c, each group of the members having an identical shape viewed from above.

However, the number, shape, or size of the both members may be indeed freely designed. For example, referring to the number, a minimum of two pieces of these members, rather than four as described, is sufficient to transmit a rotational drive from the rotary fastening tool, therefore, two or more (not limited to "four") members will do.

Furthermore, a square or polygonal collar, e.g., a hexagon shape viewed from above may also serve as an engaging portion, and a collar which is circular in shape viewed from above and provided with a plurality of bulges and recesses on its peripheral edge is also usable. Because the collar is thin, it is preferably provided with both of the described engaging holes and engaging notches so as to improve the transmission of rotational driving force.

The engaging hole 13c may be replaced with an engaging projection extending axially in the direction of engagement, and the engaging notches 14c may be replaced with a engaging protrusion extending in the direction in which it will engage with its corresponding notch. In that case, however, because four small projections or protrusions are formed on the collar, the use of the engaging holes or engaging notches as described above is preferable instead of protruding portions, considering subsequent joining of wallboards.

Thus, different configurations of the collar for engaging with the rotary fastening tool may be used, or the collar itself may also provide an engaging portion.

Although reference has been made to various kinds of embodiments, the height, length, outer diameter, or configuration of the screw head may be changed variously in design.

The vertical length or the angle of the tapered portion to the horizontal may be suitably established. As said angle thereof is brought closer to 90 degrees, the penetration efficiency of the screw head into plate material is improved.

A plurality of rows of raised ribs or long grooves may be placed vertically in parallel about the surface of the tapered portion.

The cross-shaped groove on the screw head engageable with a rotary fastening tool may be replaced with a single linear slot. The configuration of engaging portion of the screw head, such as hexagonal or square shape, may be changed to other polygonal shapes, and as in the twelfth embodiment, plural vertical concave grooves or convex ribs may be spaced in parallel on the side periphery of the columnar engaging portion.

The engaging portion engageable with a rotary fastening tool may be disposed on the collar, or the collar itself may be adapted for use as an engaging portion.

The configuration of the collar need not be restricted to the circular shape; it may be freely and properly varied to square or other polygonal shape.

If the tapered portion is so arranged as to cross the horizontal at right angles, the intruding portion of the screw head will be of a substantially columnar or prismatic shape. Plural concave grooves or convex ribs may be provided vertically side by side on the side periphery of this intruding portion.

In the present invention, the head of the drilling tapping screw may have any shape as long as the shape used can effectively penetrate plate material such as plasterboard so as to bury itself therein.

To give an actual example, the screw head preferably includes a tapered portion formed on at least a part of the periphery of thereof in such a manner that the tapered portion constitutes all or part of a sharp peripheral edge which is substantially in the shape of a cone, pyramid, or an acute end like a single linear slot head screw driver. The tapered portion may be made in different shapes as needed.

Our test shows that even if the portion to be tapered is provided with a vertical surface, it can function sufficiently; the drilling tapping screws in accordance with the fifth and sixth embodiments is a result of this discovery. In these embodiments, the penetrating portion of the screw head must be made in an elongated columnar or prismatic shape, as described above.

A plurality of raised ribs or long grooves may be provided vertically in parallel on the outer periphery of the intruding portion, as described above.

The intruding portion of the drilling tapping screws in accordance with the fifth and sixth embodiments are columnar or prismatic in shape, and the upper part of this column or prism-shaped intruding portion is hollowed out so as to thin down the edge of the upper end portion until the entire circular or prismatic end portion grows thinner like a circular or prismatic cutting edge. The upper end (edge of opened portion)of the hollowed intruding portion may be formed with vertical saw blade-like teeth or uneven teeth to ensure that the intruding portion will penetrate wallboards more easily. In such a case, the engaging portion engageable with rotary fastening tool must be equipped with a collar.

In the first aspect of the present invention, a temporary locking of plate materials to be joined may be performed by thrusting or burying the screw head in the plate materials. For example, in the joining of the plate materials to the frame members, this process may avoid the inconvenience of holding the plate materials and eventually facilitate the screwing operation.

Because the screw head is buried in the plate material, there is no risk of the plate material warping or getting wavy at the site corresponding to the positions in which the screw heads are placed, so that the plate materials may be joined and securely fixed to the frame members.

Moreover, with the screw having a temporary locking effect in accordance with the present invention, the plate materials may finally be fastened firmly by other screws, so the plate materials can be fixed at both the back and front faces thereof. This ensures that the fixing strength will be increased, which will also improve resistance to earthquakes if said screws are used in the construction of buildings such as steel house.

In the second and third aspects of the present invention, the screw head has a tapered portion composed of an outer periphery forming all or part of a tip periphery of a substantially conical or pyramidal shape with a sharp point, as in the previous aspect of the invention, so the screw head pierces a plate material well and buries itself in the plate material. Therefore, the plate material may be temporarily locked and the sites of the plate material where the screw heads are placed do not warp or get wavy.

After the plate material has been fixed to framework, the temporary locking function assuredly fixes the plate material at both the back and front sides to increase fixing strength, and resistance to earthquakes.

In the fourth aspect of the present invention, since the collar formed under the base of screw head opposite to the shank provides an engaging portion engageable with rotary a fastening tool, the configuration of the screw head adapted to pierce plate materials or bury itself in the latter may be more freely designed, so that the screw head may be made in a shape which is effective enough to assure easier penetration of the plate materials.

In the fifth and sixth aspects of the present invention, since the intruding portion of the screw head is in the shape of an oblong column or prism, as in the previous aspects of the invention, the screw head pierces plate material such as plasterboard very well, thereby to provide a temporary locking of the plate material, facilitating a subsequent fixing operation for the plate material while preventing any warping or waving of the plate material caused by the screw head. Therefore, the plate material may be flatly and smoothly fixed to the frame work for a beautiful finish. This final finishing may provide a securing of the plate material at its back and front side, thereby to increase the fixing strength and contribute to the improvement of the resistance to earthquake as well.

In the seventh aspect of the present invention, since the collar defined under the base of screw head opposite to the shank may serve as an engaging portion engageable with rotary fastening tool, the configuration of the intruding portion of the screw head may be designed more freely, as in the fourth aspect of the invention. That is, this aspect of the invention does not require a cross slot on the upper end of the intruding portion, so that the outer diameter of the intruding portion may be decreased, or the upper part of the intruding portion may be hollowed out to provide teeth on the tip peripheral edge of the intruding portion for more effective penetration of plate material by the intruding portion.

What is claimed is:

1. A self-drilling and self-tapping screw comprising:
    a threaded shank;
    a self-drilling and self-tapping portion provided at a first end of said shank;
    a head provided at a second end of said shank and including a piercing portion; and
    a portion constructed and arranged to be engageable with a driving tool, wherein said portion constructed and arranged to be engageable with the driving tool comprises a grooved portion constructed and arranged to receive the driving tool.

2. The screw according to claim 1, wherein said piercing portion extends in a direction parallel with said shank.

3. The screw according to claim 2, wherein said piercing portion extends in a direction coaxial with said shank.

4. A self-drilling and self-tapping screw comprising:

a threaded shank;

a self-drilling and self-tapping portion provided at a first end of said shank;

a head provided at a second end of said shank and including a piercing portion; and a portion constructed and arranged to be engageable with a driving tool, wherein said portion constructed and arranged to be engageable with the driving tool is a radially extending collar provided between said head and said shank.

5. The screw according to claim 4, wherein said collar is provided with a plurality of protrusions, and the driving tool is provided with a corresponding plurality of holes complimentary to said plurality of protrusions provided on said collar.

6. The screw according to claim 4, wherein said collar is provided with a plurality of protrusions, and the driving tool is provided with a corresponding plurality of notches complimentary to said plurality of protrusions provided on said collar.

7. The screw according to claim 4, wherein said collar is provided with a plurality of protrusions, and the driving tool is provided with a corresponding plurality of depressions complimentary to said plurality of protrusions provided on said collar.

8. The screw according to claim 4, wherein said collar is provided with a plurality of holes, and the driving tool is provided with a plurality of corresponding protrusions complimentary to said plurality of holes provided in said collar.

9. The screw according to claim 4, wherein said collar is provided with a plurality of notches, and the driving tool is provided with a plurality of corresponding protrusions complimentary to said plurality of notches provided in said collar.

10. The screw according to claim 4, wherein said collar is provided with a plurality of depressions, and the driving tool is provided with a plurality of corresponding protrusions complimentary to said plurality of depressions provided in said collar.

11. A self-drilling and self-tapping screw comprising:

a threaded shank;

a self-drilling and self-tapping portion provided at a first end of said shank; and a head provided at a second end of said shank and including a piercing portion, wherein said piercing portion is conical in shape.

12. The screw according to claim 11, wherein said conical piercing portion is linearly tapered.

13. The screw according to claim 11, wherein said conical piercing portion is curvingly tapered.

14. A self-drilling and self-tapping screw comprising:

a threaded shank;

a self-drilling and self-tapping portion provided at a first end of said shank; and a head provided at a second end of said shank and including a piercing portion, wherein said piercing portion is frusto-conical in shape.

15. The screw according to claim 14, wherein said frusto-conical piercing portion is linearly tapered.

16. The screw according to claim 14, wherein said frusto-conical piercing portion is curvingly tapered.

17. A self-drilling and self-tapping screw comprising:

a threaded shank;

a self-drilling and self-tapping portion provided at a first end of said shank; and a head provided at a second end of said shank and including a piercing portion, wherein said piercing portion is cylindrical in shape.

18. The screw according to claim 17, wherein a height of said cylindrical piercing portion is greater than the cross-sectional diameter thereof.

19. A self-drilling and self-tapping screw comprising:

a threaded shank;

a self-drilling and self-tapping portion provided at a first end of said shank; and a head provided at a second end of said shank and including a piercing portion, wherein said piercing portion is prismatic.

20. The screw according to claim 19, wherein a height of said prismatic piercing portion is greater than the largest cross-sectional dimension thereof.

21. A self-drilling and self-tapping screw comprising:

a threaded shank;

a self-drilling and self-tapping portion provided at a first end of said shank;

a head provided at a second end of said shank and including a piercing portion; and a portion constructed and arranged to be engageable with a driving tool, wherein said portion constructed and arranged to be engageable with the driving tool is a multifaced portion located between said head and said shank.

22. A self-drilling and self-tapping screw comprising:

a threaded shank;

a self-drilling and self-tapping portion provided at a first end of said shank; and a head provided at a second end of said shank and including a piercing portion, wherein said piercing portion is pyramidal in shape.

23. A self-drilling and self-tapping screw comprising:

a threaded shank;

a self-drilling and self-tapping portion provided at a first end of said shank; and a head provided at a second end of said shank and including a piercing portion, wherein said piercing portion includes a conical surface including a plurality of scalloped portions.

24. A self-drilling and self-tapping screw comprising:

a treaded shank;

a self-drilling and self-tapping portion provided at a first end of said shank; and a head provided at a second end of said shank and including a piercing portion, wherein said piercing portion comprises a pair of planar surfaces converging so as to meet at distal edge.

* * * * *